(12) United States Patent
LaConte

(10) Patent No.: US 9,567,778 B2
(45) Date of Patent: Feb. 14, 2017

(54) METHODS FOR INSTALLATION OF POTTED INSERTS HAVING A LATCH MECHANISM

(71) Applicant: Harper Engineering Company, Renton, WA (US)

(72) Inventor: Richard J. LaConte, Black Diamond, WA (US)

(73) Assignee: Harper Engineering Company, Renton, WA (US)

( * ) Notice: Subject to any disclaimer, the term of this patent is extended or adjusted under 35 U.S.C. 154(b) by 153 days.

(21) Appl. No.: 14/516,426

(22) Filed: Oct. 16, 2014

(65) Prior Publication Data

US 2015/0101163 A1  Apr. 16, 2015

Related U.S. Application Data

(60) Provisional application No. 61/891,825, filed on Oct. 16, 2013.

(51) Int. Cl.
| | |
|---|---|
| *B23P 6/00* | (2006.01) |
| *E05B 83/16* | (2014.01) |
| *E05B 79/02* | (2014.01) |
| *E05B 81/00* | (2014.01) |
| *B64D 11/00* | (2006.01) |

(Continued)

(52) U.S. Cl.
CPC .................. *E05B 83/16* (2013.01); *B23P 6/00* (2013.01); *E05B 79/02* (2013.01); *E05B 81/00* (2013.01); *B21D 53/92* (2013.01); *B23P 2700/12* (2013.01); *B64D 11/003* (2013.01); *E05B 2047/0091* (2013.01); *F16B 11/006* (2013.01); *Y10T 29/49716* (2015.01); *Y10T 29/49721* (2015.01); *Y10T 29/49732* (2015.01)

(58) Field of Classification Search
CPC .................... Y10T 29/49721; Y10T 29/49732; Y10T 29/4973; B23P 6/00; B23P 2700/01; B23P 2700/12; B64D 11/003; E05B 79/00; E05C 1/145; F16B 11/006; B21D 53/92
See application file for complete search history.

(56) References Cited

U.S. PATENT DOCUMENTS

| | | |
|---|---|---|
| 3,598,273 A | 8/1971 | Rau et al. |
| 3,964,636 A | 6/1976 | Rehrig |

(Continued)

OTHER PUBLICATIONS

Aluminum Alloy Door Release Button Switch, Jul. 19, 2013.*

(Continued)

*Primary Examiner* — Jermie Cozart
(74) *Attorney, Agent, or Firm* — Seed IP Law Group LLP

(57) ABSTRACT

A method for use when retrofitting a panel of a storage compartment having a mechanical latch assembly with an electric latch assembly includes removing the mechanical latch assembly from the panel of the storage compartment; and preparing the panel of the storage compartment to receive a potted insert. The preparation may include defining and marking a location to receive the potted insert. The method may include removing a portion of the panel to define a potted insert cavity and inserting the potted insert through the potted insert cavity of the panel. The method may also include applying at least one of a potting compound and an adhesive to bond the potted insert to the panel and coupling a portion of the electric latch assembly to the potted insert.

12 Claims, 6 Drawing Sheets

(51) Int. Cl.
*F16B 11/00* (2006.01)
*B21D 53/92* (2006.01)
*E05B 47/00* (2006.01)

(56) References Cited

U.S. PATENT DOCUMENTS

| | | |
|---|---|---|
| 4,344,995 A | 8/1982 | Hammer |
| 4,799,631 A | 1/1989 | Humphries et al. |
| 4,867,395 A | 9/1989 | Taylor et al. |
| 4,936,377 A | 6/1990 | DeVogel et al. |
| 5,005,531 A | 4/1991 | Nelson |
| 5,028,474 A | 7/1991 | Czaplicki |
| 5,086,587 A | 2/1992 | Andrews |
| 5,108,048 A | 4/1992 | Chang |
| 5,150,863 A | 9/1992 | Hozumi |
| 5,795,043 A | 8/1998 | Johnson et al. |
| 6,056,349 A | 5/2000 | Seksaria et al. |
| 6,574,841 B1 | 6/2003 | Vosahlik et al. |
| 6,623,209 B1 | 9/2003 | Waters, Jr. |
| 6,718,776 B2 | 4/2004 | Wessling et al. |
| 6,742,974 B2 | 6/2004 | Haire |
| 7,380,858 B2 | 6/2008 | Araga et al. |
| 7,484,792 B2 | 2/2009 | Penner |
| 7,537,264 B2 | 5/2009 | Maimin et al. |
| 7,637,686 B2 | 12/2009 | Wood et al. |
| 7,789,452 B2 | 9/2010 | Dempsey et al. |
| 7,874,587 B2 | 1/2011 | Miki et al. |
| 7,931,237 B2 | 4/2011 | Penzo |
| 7,942,430 B2 | 5/2011 | Van Loon et al. |
| 8,061,758 B2 | 11/2011 | Maimin et al. |
| 8,182,021 B2 | 5/2012 | Maimin et al. |
| 8,215,585 B2 | 7/2012 | Gerken et al. |
| 8,286,917 B2 | 10/2012 | Erickson et al. |
| 8,286,919 B2 | 10/2012 | Gerken et al. |
| 8,616,621 B2 | 12/2013 | LaConte |
| 2003/0024191 A1 | 2/2003 | Hampel |
| 2005/0028333 A1 | 2/2005 | Vosahlik et al. |
| 2005/0252114 A1 | 11/2005 | Marschall |
| 2007/0267889 A1 | 11/2007 | Flendrig et al. |
| 2008/0110056 A1 | 5/2008 | Mann et al. |
| 2012/0031010 A1* | 2/2012 | LaConte ............... B64D 11/003 49/503 |
| 2012/0205939 A1 | 8/2012 | Maimin et al. |
| 2014/0137385 A1 | 5/2014 | LaConte |

OTHER PUBLICATIONS

Shur-Lok Products, "Sandwich Structure," 2012, retrieved from http://www.shur-lok.com/contents/products/sandwich.html, on Aug. 12, 2013, 1 page.

\* cited by examiner

METHODS FOR INSTALLATION OF POTTED INSERTS HAVING A LATCH MECHANISM

BACKGROUND

Technical Field

The present disclosure is generally related to potted inserts, and more particularly, to installation of potted inserts having a latch mechanism.

Description of the Related Art

Storage compartments used on various transportation vehicles, such as automobiles, buses, and aircraft, may be operable between an open and closed position. Shifting between the open and closed positions may be achieved through a mechanical latch system connected to a mechanical release component, such as, for example, a handle. Such mechanical latch systems, however, are expensive to maintain, as the mechanical latch system may comprise of multiple moving parts wherein each moving part would have to be sufficiently maintained, thus adding to maintenance costs. Further, having multiple moving parts would add avoidable payload to the transportation vehicles, thereby increasing fuel consumption. Still further, mechanical latch systems may not be aesthetically pleasing to passengers traveling on such transportation vehicles. As such, electric latch mechanisms provide a pleasing and less costly alternative to mechanical latch mechanisms.

BRIEF SUMMARY

Embodiments described herein provide methods for installing or retrofitting storage compartment panels with potted inserts having an electric latch mechanism in a particularly accurate manner and in a compact and robust form factor. According to one embodiment, a method for use when retrofitting a panel of a storage compartment having a mechanical latch assembly with an electric latch assembly may be summarized as including: removing the mechanical latch assembly from the panel of the storage compartment; preparing the panel of the storage compartment to receive a potted insert, the preparation including defining and marking a location to receive the potted insert; removing a portion of the panel to define a potted insert cavity; inserting the potted insert through the potted insert cavity of the panel; applying at least one of a potting compound and an adhesive to bond the potted insert to the panel; and coupling a portion of the electric latch assembly to the potted insert.

According to another embodiment, a method for use when installing a potted insert to a storage compartment may be summarized as including: preparing a panel of the storage compartment to receive the potted insert, the preparation including defining and marking a location to receive the potted insert; removing a portion of the panel to define a potted insert cavity; inserting the potted insert through the potted insert cavity of the panel; applying at least one of a potting compound and an adhesive to bond the potted insert to the panel; and coupling a portion of an electric latch assembly to the potted insert.

DETAILED DESCRIPTION

The following detailed description is directed toward methods for installing potted inserts, such as inserts having an electric latch, to storage compartments of transportation vehicles such as automobiles, buses, and aircraft, among others. The following detailed description and corresponding figures are intended to provide an individual of ordinary skill in the art with sufficient information to enable that individual to make and use the embodiments of the invention. Such an individual, however, having read this entire detailed description and reviewed the figures, will appreciate that modifications can be made to the illustrated and described embodiments, and/or elements removed therefrom, without deviating from the spirit of the disclosed subject matter. It is intended that all such modifications and deviations fall within the scope of the disclosed subject matter, to the extent that they are within the scope of the associated claims.

References throughout this specification to "one embodiment" or "an embodiment" means that a particular feature, structure or characteristic described in connection with the embodiment is included in at least one embodiment of the disclosed structures and/or methods. Thus, the appearances of the phrases "in one embodiment" or "in an embodiment" in various places throughout the specification are not necessarily all referring to the same embodiment. Furthermore, the particular features, structures, or characteristics may be combined in any suitable manner in one or more embodiments.

FIGS. 1-6 illustrate a method 10 for installing a potted insert 30 to a storage compartment panel 40, according to one embodiment. Although the shown embodiment illustrates the method 10 as applied to a prototype, an individual of ordinary skill in the art, having reviewed this entire disclosure, will immediately appreciate that the method 10 extends to installation of the potted insert 30 to a ready to be installed storage compartment panel or to retrofit an already installed storage compartment panel. For instance, in some embodiments, the storage compartment panel 40 to be retrofitted may include a mechanical latch assembly. In other embodiments, the storage compartment panel, however, may include any other types of latch assemblies. At step 12, the mechanical latch assembly (not shown) or any other type of installed latch assembly is disassembled. Disassembly of the mechanical latch assembly may involve removing components, such as unneeded springs, fasteners, hinges, tie-rods, and the like. The mechanical latch assembly is thereafter removed from the storage compartment panel 40.

Figure 1:
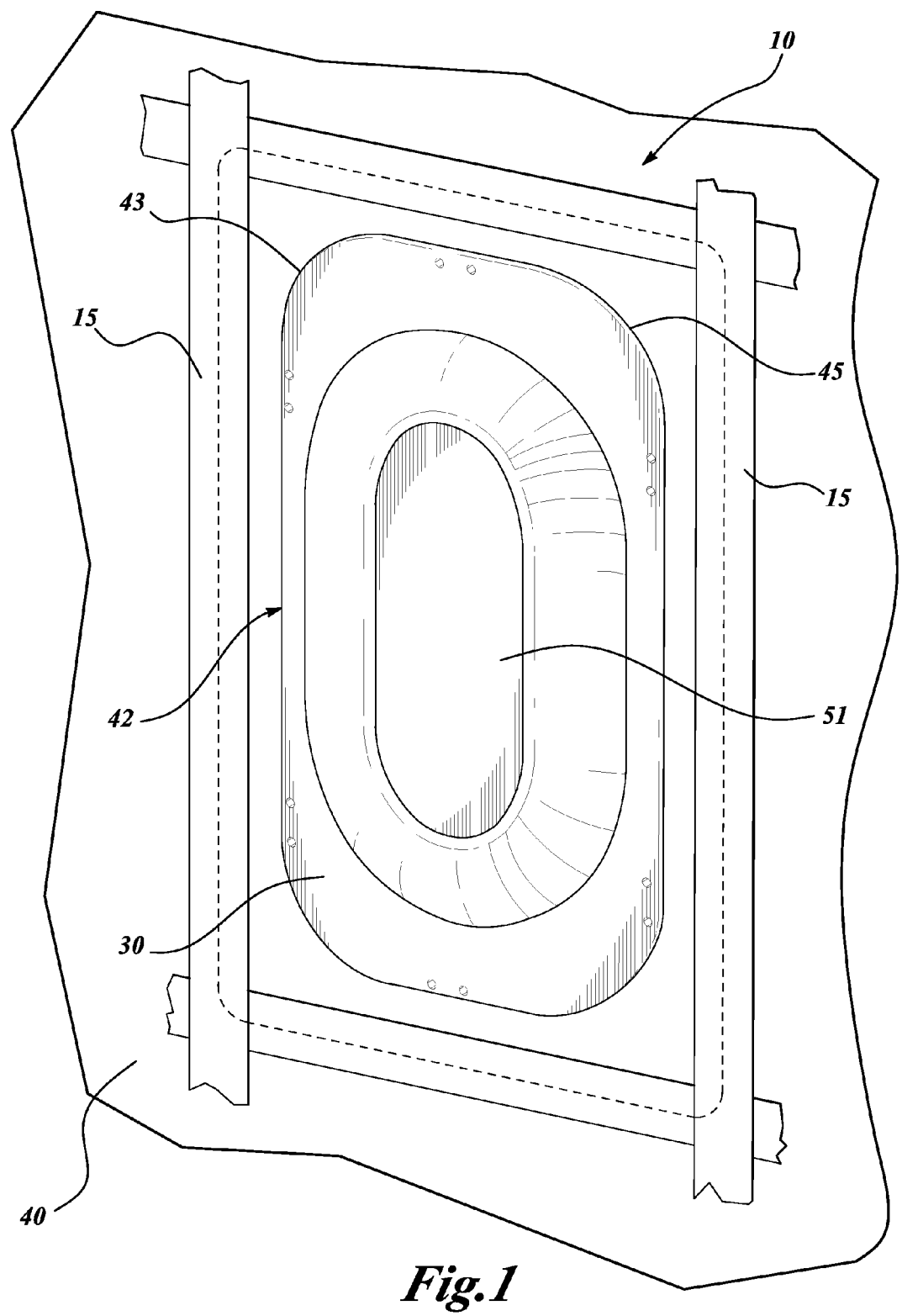
FIG. 1 is a perspective view of a portion of a storage compartment panel illustrating an aspect of a method of installing a potted insert, according to one embodiment.

At step 14, a location on the storage compartment panel 40 is defined and marked. The marking may be accomplished using suitable means, such as masking tape, markers, or the like. For example, FIG. 1 illustrates a tape 15 that is coupled to the storage compartment panel 40. The tape 15 defines a boundary which encompasses a region of the storage compartment panel 40 where the potted insert 30 is to be installed.

A portion of the storage compartment panel 40 is thereafter removed at step 16 to define a cavity 42 for receiving the potted insert 30. The cavity 42 has an exterior profile 43. The exterior profile 43 of the cavity 42 is configured to receive therein the potted insert 30. For example, the exterior profile 43 of the cavity 42 may have a size and shape that encompasses an outer profile 45 of the potted insert 30. Removal of the portion of the storage compartment panel 40 may be accomplished by manually cutting or routing the storage compartment panel 40 using hand-held devices, such as routers, cutters, jigsaw blades, or the like. In other instances, removal of the portion of the storage compartment panel 40 may also be accomplished via numerically controlled machines.

Figure 2:
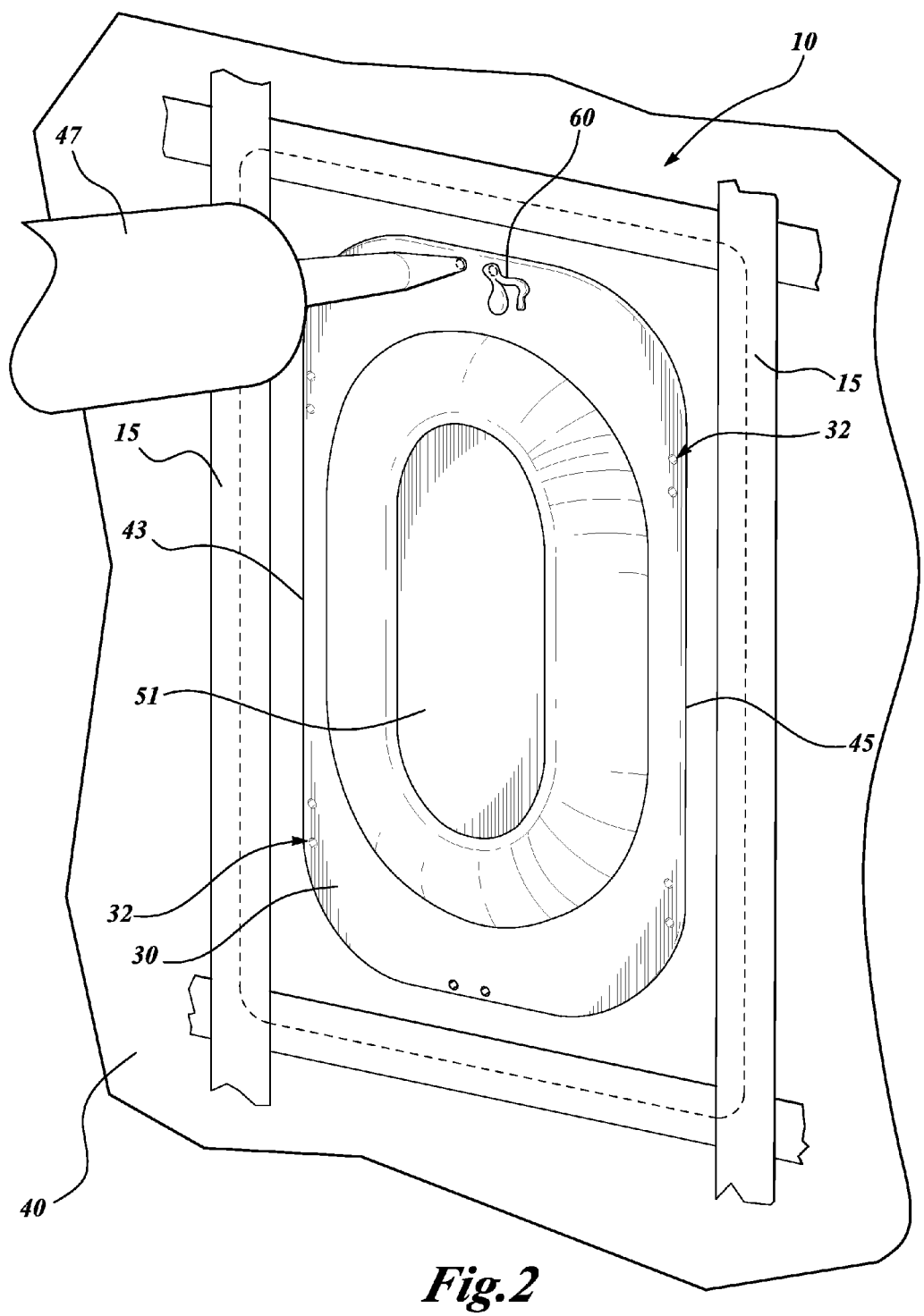
FIG. 2 is a perspective view of the portion of the storage compartment panel of FIG. 1, illustrating an aspect of the method of installing the potted insert.

The potted insert 30 is inserted in the storage compartment panel 40 through the cavity 42 at step 17. The potted insert 30 includes a plurality of apertures 32. The apertures 32 are located proximal to the outer profile 45 of the potted insert 30. A potting compound 60 is injected via apertures 32 in the potted insert 30 at step 18. As illustrated in FIG. 2, the potting compound 60 may be injected using various injection tools (e.g., tubes, guns, etc.). For example, FIG. 2 illustrates an injector tube 47 that carries the potting compound 60 and includes a tip to release the potting compound 60. The potting compound 60 may be an epoxy based resin or other form of adhesive and may be applied by using injector nozzles, applicator guns, or the like, as noted above.

In order to prevent or avoid potting compound 60 from contacting the interior of the storage compartment panel 40, and to provide structural support, a backing plate may be installed on an interior surface of the storage compartment panel 40. For example, the backing plate may be located proximal to the interior surface of the storage compartment panel 40. The backing plate may be sized and shaped to extend beyond the outer profile 45 of the potted insert 30 such that the potting compound 60 may be prevented from extending to or contacting the interior of the storage compartment panel 40.

Figure 3:
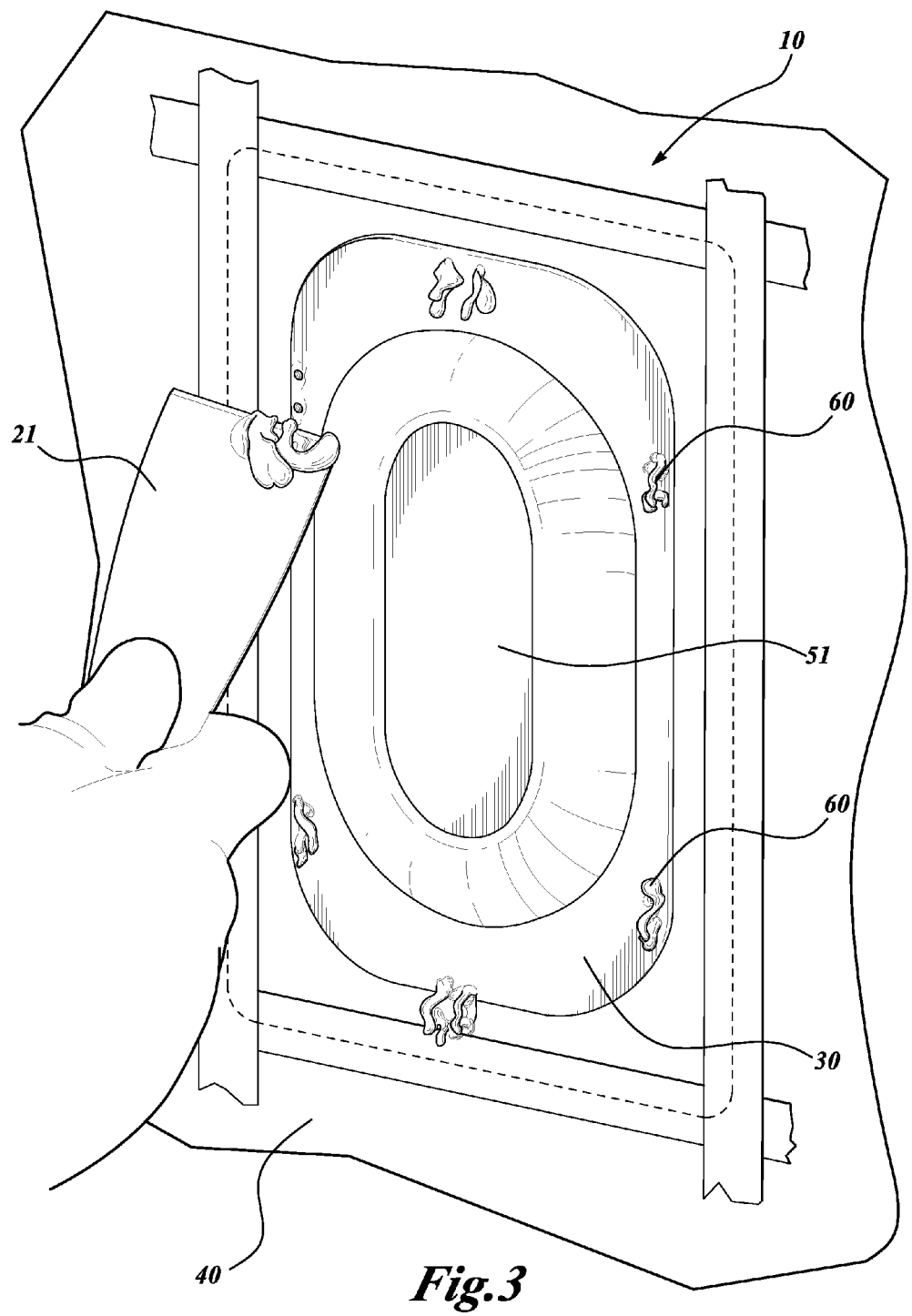
FIG. 3 is a perspective view of the portion of the storage compartment panel of FIG. 1, illustrating an aspect of the method of installing the potted insert.
Figure 4:
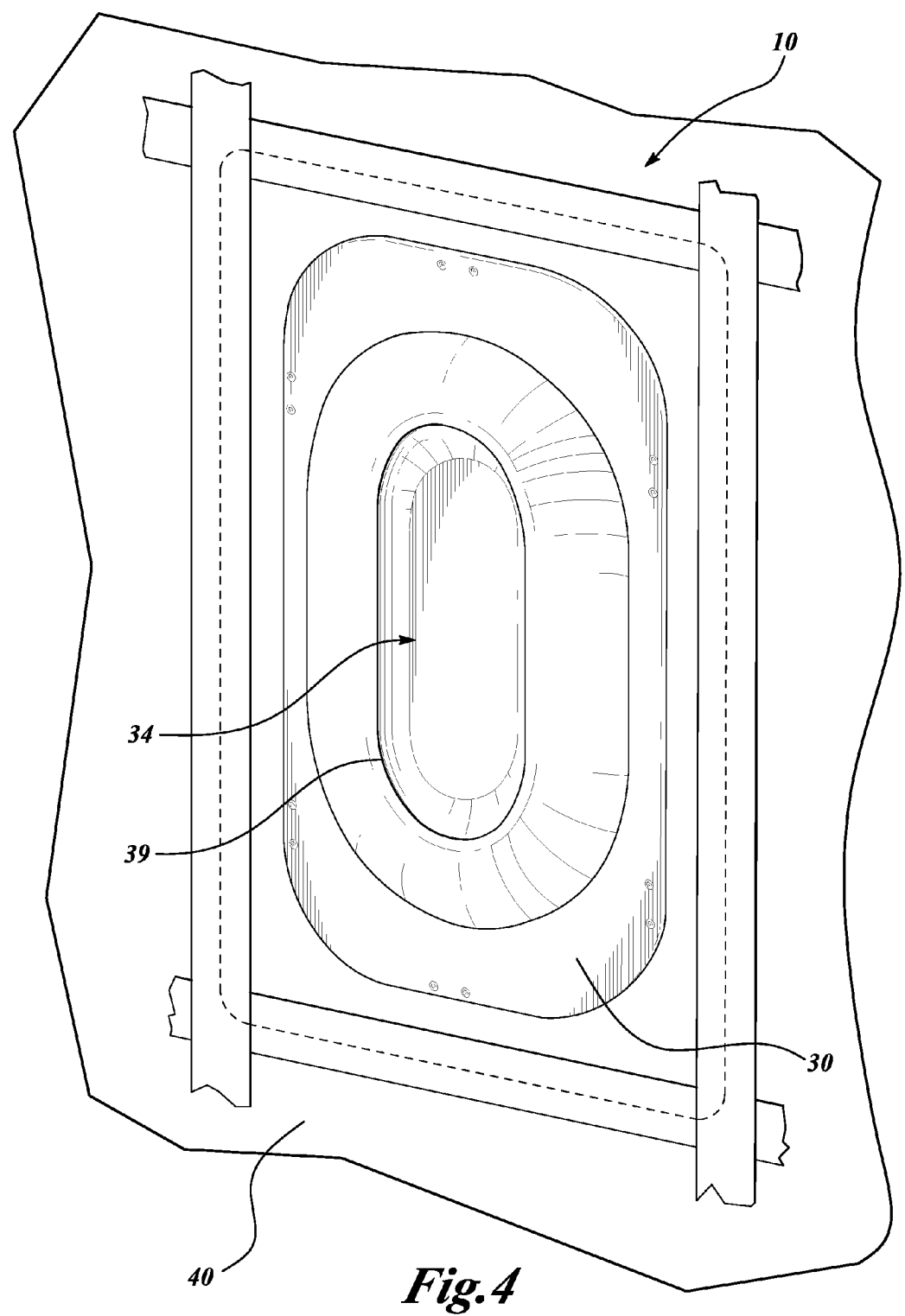
FIG. 4 is a perspective view of the portion of the storage compartment panel of FIG. 1, illustrating an aspect of the method of installing the potted insert.
Figure 5:
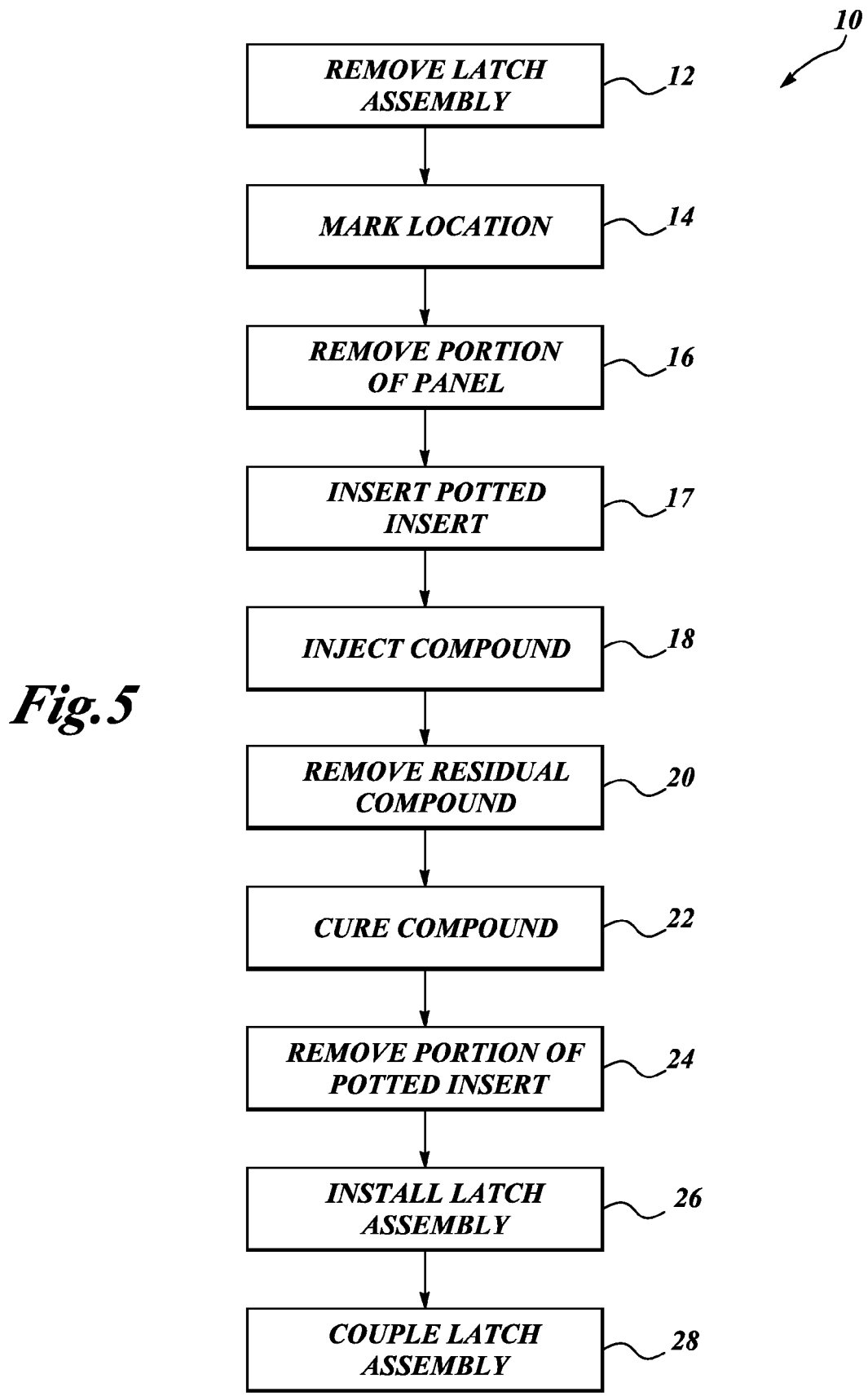
FIG. 5 is a flow diagram of a method to install a potted insert, according to one embodiment.
Figure 6:
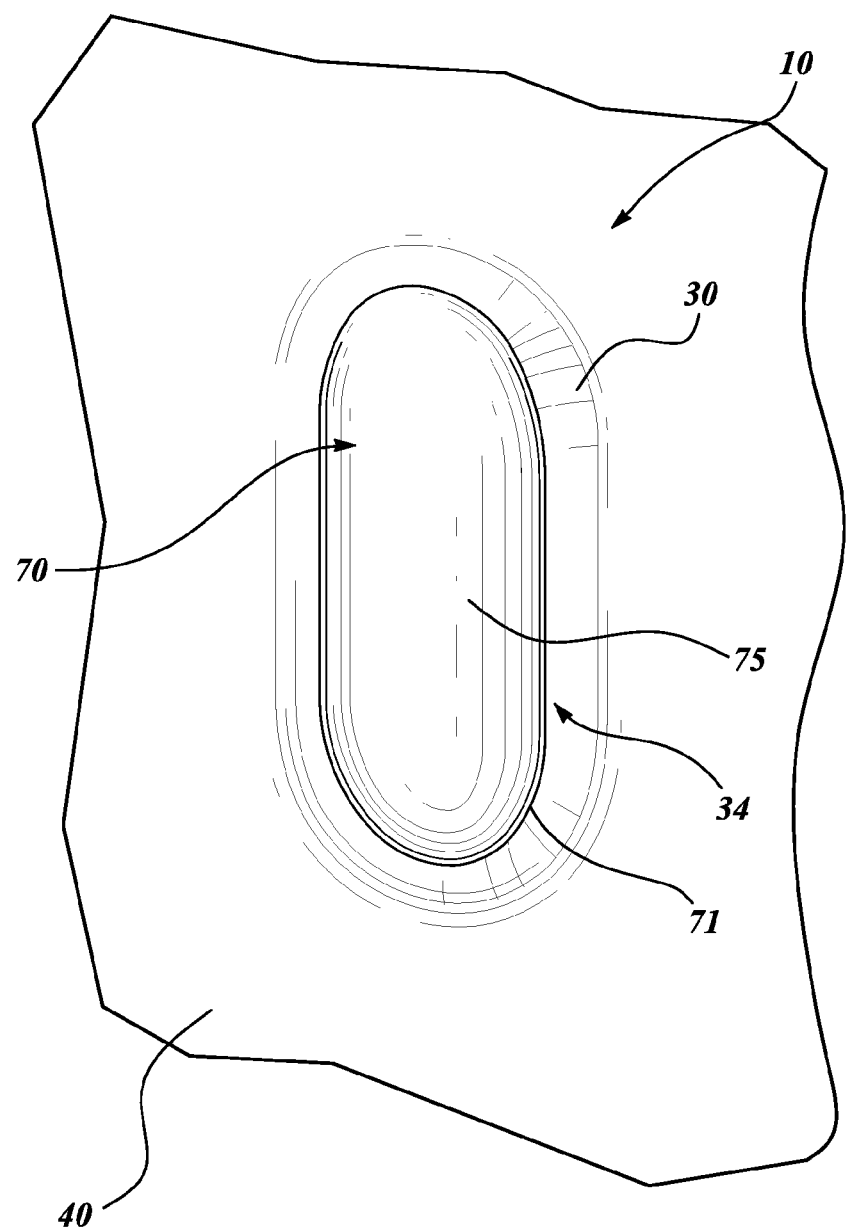
FIG. 6 is a perspective view of the portion of the storage compartment panel of FIG. 1 having an electric latch installed thereto.

As the potting compound 60 begins to fill through a cavity or recess within the potted insert 30, the potting compound 60 eventually collects around the periphery of the potted insert 30 adjoining the storage compartment panel 40. Thereafter, as illustrated in FIG. 3, any residual potting compound 60 squeeze-out is removed at step 20. Removal may be accomplished by scraping off excess potting compound or by wiping away excess potting compound via a knife 21, or wiping cloths, or the like.

At step 22, the potting compound 60 is cured. The potting compound 60 may be cured at ambient temperature or at elevated temperatures by use of appropriate heaters. After the potting compound 60 has cured, the potted insert 30 is ready for installation of an electric latch assembly 70. A recessed portion 51 of the potted insert 30 is thereafter removed at step 24 to define a cavity 34. The recessed portion 51 of the potted insert 30 may be removed by manually cutting or routing the panel using hand-held devices, such as routers, cutters, jigsaw blades, or the like. In other instances, removal of the portion of the potted insert 30 may also be accomplished via numerically controlled machines.

With continued reference to FIGS. 1 through 6, the cavity 34 is configured to receive therein the electric latch assembly 70. The cavity 34 has an exterior profile 39. The exterior profile 39 of the cavity 34 may have a size and shape that encompass an outer profile 71 of the electric latch assembly 70. In particular, the exterior profile 39 of the cavity 34 has a boundary that surrounds a button 75 of the electric latch assembly 70.

Upon removal of the recessed portion 51, the electric latch assembly is installed to the potted insert 30 at step 26. Although not shown in the illustrated embodiment, after installation of the electric latch assembly 70, a transition sheet may be coupled to an external surface of the potted insert 30, such that the external surface of the potted insert 30 smoothly transitions to the surrounding storage compartment panel 40. Still further, a protective coating may also be applied to the potted insert 30. The protective coating may be applied for flammability, moisture-protection, or other purposes to protect the storage compartment panel 40 and surrounding structure.

At step 28, the electric latch assembly 70 is wirelessly or through a wired connection coupled to a power supply and to a mechanical portion of the electric latch assembly 70 in a known manner, such that the storage compartment may be operable between latched and release positions.

Moreover, the various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for use when retrofitting a panel of a storage compartment having a mechanical latch assembly with an electric latch assembly, the method comprising:
   removing the mechanical latch assembly from the panel of the storage compartment;
   preparing the panel of the storage compartment to receive a potted insert, the preparation including defining and marking a location to receive the potted insert;
   removing a portion of the panel to define a potted insert cavity;
   inserting the potted insert through the potted insert cavity of the panel;
   applying at least one of a potting compound and an adhesive to bond the potted insert to the panel; and
   coupling a portion of the electric latch assembly to the potted insert.

2. The method of claim 1, further comprising:
   coupling a transition sheet to an external surface of the potted insert, the transition sheet configured to smoothly transition the external surface of the potted insert to a surrounding area of the panel of the storage compartment.

3. The method of claim 1, further comprising:
   applying a protective coating to the external surface of the potted insert.

4. The method of claim 1 wherein coupling the portion of the electric latch assembly to the potted insert includes at least one of mechanically coupling the portion of the electric latch assembly to the potted insert and electrically coupling the portion of the electric latch assembly to a power supply.

5. The method of claim 1, further comprising:
positioning a backing plate around an internal surface of the potted insert to protect an interior of the storage compartment from an excess residue of at least one of the potted compound and the adhesive.

6. The method of claim 1, further comprising:
removing a portion of the potted insert to define a latch cavity which is sized and shaped to receive the electric latch assembly, the removing occurring after inserting the potted insert through the potted insert cavity of the panel.

7. The method of claim 1 wherein the potted insert includes a raised portion surrounding a latch cavity which is sized and shaped to receive the electric latch assembly, the raised portion protruding outwardly relative to an upper surface of the potted insert.

8. A method for use when installing a potted insert to a storage compartment, the method comprising:
preparing a panel of the storage compartment to receive the potted insert, the preparation including defining and marking a location to receive the potted insert;
removing a portion of the panel to define a potted insert cavity;
inserting the potted insert through the potted insert cavity of the panel;
applying at least one of a potting compound and an adhesive to bond the potted insert to the panel;
after bonding the potted insert to the panel, removing a portion of the potted insert to define a latch cavity which is sized and shaped to receive an electric latch assembly; and
coupling a portion of the electric latch assembly to the potted insert.

9. The method of claim 8, further comprising:
coupling a transition sheet to an external surface of the potted insert, the transition sheet configured to smoothly transition the external surface of the potted insert to the surrounding panel of the storage compartment.

10. The method of claim 8 wherein coupling the portion of the electric latch assembly to the potted insert includes at least one of mechanically coupling the portion of the electric latch assembly to the potted insert and electrically coupling the portion of the electric latch assembly to a power supply.

11. The method of claim 10, further comprising:
positioning a backing plate around an internal surface of the potted insert to protect an interior of the storage compartment from an excess residue of at least one of the potted compound and the adhesive.

12. The method of claim 8 wherein the potted insert includes a raised portion surrounding the latch cavity which is sized and shaped to receive the electric latch assembly, the raised portion protruding outwardly relative to an upper surface of the potted insert.

* * * * *